United States Patent [19]

Grant

[11] Patent Number: 4,648,501

[45] Date of Patent: Mar. 10, 1987

[54] APPARATUS FOR SORTING AND ALIGNING HANDLES FOR CARDBOARD BOXES OR THE LIKE AND FOR SUPPLYING SUCH TO AN INSERTION APPARATUS

[75] Inventor: Willson B. D. Grant, Qu'Appelle; Little Ffieth, Henley-on-Thames, Great Britain, RG9 6NV

[73] Assignees: Barbara Ann Grant; Willson Barratt David Grant, both of Henley-on-Thames, Great Britain

[21] Appl. No.: 737,411

[22] Filed: May 24, 1985

[30] Foreign Application Priority Data

May 24, 1984 [GB] United Kingdom ............... 8413373

[51] Int. Cl.⁴ .................................................. B65G 47/24
[52] U.S. Cl. ...................................... 198/397; 198/398
[58] Field of Search ........................... 198/396–398, 198/388; 221/159–161, 164–166

[56] References Cited

U.S. PATENT DOCUMENTS 2,625,313  1/1953  Resina ............................. 198/396
2,998,119  8/1961  Winberg .......................... 198/396
3,791,537  2/1974  Conklin ........................... 198/397

Primary Examiner—Joseph E. Valenza
Attorney, Agent, or Firm—Dennison, Meserole, Pollack & Scheiner

[57] ABSTRACT

An apparatus for sorting plastics material handles for cardboard boxes or the like containers. The handles include a main, elongate portion with a lug at each end extending on either side of the plane of said elongate portion and subtending an acute angle at one side of the handle. A housing defining a reservoir portion for receiving a supply of randomly disposed handles includes a circulatory or rotary support and drive therefor, supporting one or more carrier rods which are displaceable through the reservoir portion. The carrier rods are each of a diameter to engage between the main elongate portion of the handle and the portion of the lug defining an acute angle (45°) therewith. The handles are picked up by said carrier rods and are transported by the carrier rods only on one side thereof for further processing. Aligning plates remove the sorted handles in alignment and supply them for subsequent handling and processing. The handles carried by the carrier rods are arranged to ensure that they are supported on one selected side of the carrier rod and selected handle displacing devices are positioned beneath each carrier rod when it is in an upper region of its movement path and engageable with one or more handles suspended therefrom to displace the main bodies of the handles upwardly and to one side of said carrier rod and cause any handle or handles disposed on one "incorrect" side of each said carrier rod to be disengaged from said carrier rod permitting any handle or handles disposed on the opposite "correct" side of said carrier rod to remain suspended therefrom.

8 Claims, 17 Drawing Figures

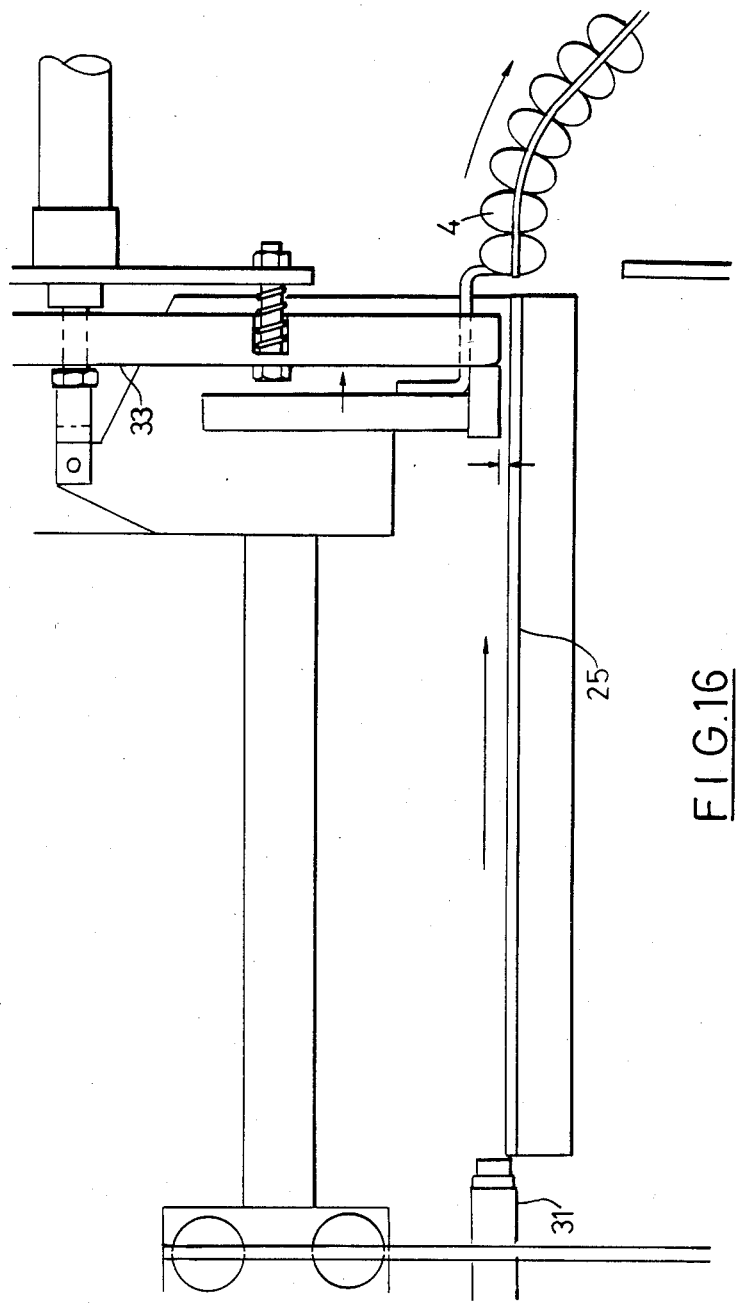

APPARATUS FOR SORTING AND ALIGNING HANDLES FOR CARDBOARD BOXES OR THE LIKE AND FOR SUPPLYING SUCH TO AN INSERTION APPARATUS

The present invention relates to an apparatus for sorting and aligning plastics material handles such as are sold under the trade mark "Formus" and as designed and manufactured by Bertil Wigemark of Goeteborg, Sweden.

These plastics material handles are particularly suitable for use with cardboard boxes especially those for containing flexible plastics bags for containing liquids, such as wine, and wherein the top side of the cardboard box has two spaced apart apertures for receiving retention lugs of the handle. The "Formus" handles comprise an elongate strip of plastics material forming the main handle body and having a shaped lug moulded at each end thereof and each extending on either side of the elongate portion in a plane extending at approximately 45° to the plane of the elongate main body portion. The normally lower surface of the elongate main body portion of the handle is preferably smooth and curved whilst the opposite surface has a plurality of spaced apart transvese rib portions extending between edge portions. The "Formus" handles are produced by injection moulding and supplied individually in bulk and in random disposition.

Hitherto the handles have been manually inserted into boxes which operation is a time-consuming and expensive procedure. It is an object of the present invention to provide an apparatus which will sort and align the handles from the bulk supply and also to provide an apparatus which will supply the thus sorted handles to an insertion apparatus for inserting the handles in boxes.

It is also an object of the present invention to provide an insertion apparatus for inserting handles in boxes which may be fed manually or may be combined with a sorting and aligning apparatus such as also forms the subject of the present invention.

According to one aspect of the present invention an apparatus for sorting plastics material handles for cardboard boxes or the like containers, with said handles comprising a main, elongate portion with a lug at each end extending on either side of the plane of said elongate portion and subtending an acute angle at one side of the handle, comprises a housing defining a reservoir portion for receiving a supply of randomly disposed handles; circulatory or rotary support means, and drive means therefor, supporting one or more carrier rods (or means) which are displaceable through said reservoir portion and which carrier rods are each of a diameter such as to be able to engage between the main elongate portion of the handle and the portion of the lug subtending an acute angle therewith; means for ensuring handles picked-up by said carrier rods are transported by said carrier rods only on one selected side thereof for further processing; and means for removing the thus sorted handles in alignment and supplying such for subsequent handling and processing; wherein said means for sorting the handles carried by the carrier rods so as to ensure the handles are supported on one selected side of the carrier rod comprises a selective, handle-dislodging member displaceable beneath each carrier rod when it is in an upper region of its movement path and engageable with one or more handles which may be suspended therefrom so as to displace the main bodies of the handles upwardly and to one side of said carrier rod and cause any handle or handles disposed on one "incorrect" side of each said carrier rod to be disengaged from said carrier rod whilst permitting any handle or handles disposed on the opposite, "correct" side of said carrier rod to remain suspended therefrom.

It is to be appreciated that reference subsequently herein to "handles" is intended to relate to the specific plastics material handles, such as sold under the trade name "Formus" and as designed and produced by Bertil Wigemark of Goeteborg, Sweden, wherein they each comprise a main elongate handle portion having a lug integrally formed at each end and extending on either side of main handle portion and with each lug extending generally in a plane which subtends an acute angle, preferably approximately 45°, on one side thereof and an obtuse angle, preferably 135°, on the other side thereof. Handles are known wherein end lug portions extend at right angles to the main elongate body portion of the handle when the handle is on its own and not inserted in a box and the apparatus of the present invention is not intended for use with such handles.

The carrier means will preferably comprise a plurality of substantially horizontally disposed elongate rods preferably extending from a rotary disc or ring acting as the rotary support means and with said rods being rotatable so as to pass through the region of the housing which is to contain a randomly disposed reservoir of handles and displaceable therethrough so as to move upwardly through the reservoir of handles to an upper position wherein said selective, handle dislodging means acts on any handles carried thereby.

The housing for such a rotary disc will preferably have a lower portion with a cylindrical defining edge wall extending between preferably two substantially vertical side walls and the axis of rotation of said disc will preferably be eccentrically disposed relative to the centre of the circle from which the cylindrical portion is generated so that in the region where carrier rods may engage handles, the path thereof moves gradually away from the cylindrical wall thereby avoiding any risk of trapping handles against the outer wall of the housing.

The selective handle-dislodging means will preferably comprise an elongate, substantially horizontally disposed handle engaging rod mounted, preferably on the end of a pivotally mounted lever arm activated by a pneumatic piston cylinder arrangement, and so disposed on the housing of the apparatus as to be displaceable preferably along an arcuate path and preferably from a position outside of the path of rotation of the rods, through said path and beneath each of the rods when it arrives in an upper position, and then the engaging rod moves upwardly to substantially the same horizontal level as the carrier rod in the upper position on which any handles are suspended so as to engage and tilt any handles carried by said carrier rod and disengage incorrectly disposed handles from one side of said carrier rod for such to be returned to the main storage part or reservoir. It has been found particularly advantageous for the position of engagement of the engaging rod with respect to the handles supported on a carrier rod, especially in the uppermost position of displacement thereof, to be such that the centre of gravity of the handles supported thereon be between the uppermost operative position of said disengaging rod and the carrier rod in said upper position so that the weight of a correctly supported handle retains the handle in position on the carrier rod whilst an incorrectly suspended handle will disengage its lug from the carrier rod and return to the reservoir. It is also important that the uppermost operative position of the selective disengaging means should not be too close to the free end of a handle remote from the carrier rod so as to engage therewith and possibly dislodge a correctly suspended handle. Subsequently the selective disengaging means is returned to its original position.

Preferably the carrier rods are rotated so as to undergo an indexing movement or stepwise rotation and each carrier rod is stationary when in the upper position when the selective disengaging means operates.

In a dislodging station subsequent to the selective disengaging or sorting station, the handles supported on the "correct" side of said carrier rod are engaged by dislodging means so as to dislodge any handles which are located on one side of said carrier rod but which are located one on top of the other, i.e. with the lug of an upper handle engaging on top and over the lug of a lower handle suspended on the carrier rod, and such dislodging means may comprise an air jet so as to traverse the uppermost tips of the lugs of supported handles or preferably comprise an oscillatable combing member. Preferably the combing member comprising a plurality of spaced apart and offset tines or fingers with the spacing between adjacent tines, which may be arranged in alternate rows, being less than the width of an end lug which they are to engage. This dislodging station is preferable although not essential to the operation.

Following the sorting station and possibly the dislodging station, an aligning and discharge station is provided in an upper region of the apparatus and includes an apparatus which operates so as to remove the handles correctly disposed on one side of the carrier means in an aligned and orderly manner.

Also according to the present invention in a sorting and aligning apparatus wherein handles are sorted into a "correctly" disposed position suspended on carrier means, an aligning and discharge apparatus, which itself may form a separate inventive feature comprises displaceable positioning means for contacting and displacing a handle or handles each suspended from a carrier means by an upper lug portion and for engaging the or each lower lug portion not engaged with a carrier means so that one or more handles engaged by said engaging and positioning means may be positioned so as to be slidably displaceable therealong and along said carrier means by a pusher device forming part of the apparatus and said pusher device acting to displace said handle or handles from said carrier means and said engaging and positioning means to a discharge station for subsequent retention in aligned disposition by magazine means leading to an insertion apparatus which is to locate the handles in boxes conveyed thereunder by a suitable conveyor means. The magazine and also the insertion apparatus may form separate interconnectable units connectable with the aligning apparatus and may form separate inventive aspects of the invention.

The displaceable positioning means which preferably comprise a shaped platform or plate which also provides support in the region of the end of the handle engaged on the carrier means, preferable carrier rods, when in its uppermost and operative position supports the handles in a substantially horizontal disposition. Two parallel outer guide and retention means, which are preferably elongate rails, are located above the handles at little more than the thickness of the elongate portion of a handle so as to retain such against upward displacement. Between these outer guide and retention means there is a central guide and retention means running along and over the position of disposition of handles supported on the displaceable positioning means at a spacing therefrom of approximately twice the thickness of the elongate portion of the handles so as to permit any crossed handles to be displaced by the pusher device into abutment with a reversing means which is located at one end of the guide and retention means and when contacted by the pusher device or by the increased thickness of elongate handle portions resulting from an undesired "crossed" positioning thereof, causes reversal of the pusher device and permits the handles to be returned to the reservoir.

The magazine preferably comprises in the entrance region thereto, two laterally spaced apart slots each defined by vertically spaced guide members and located or locatable so as to receive the elongate portions of the handles adjacent the lugs from the discharge station of said sorting and aligning apparatus and to engage within the acute, preferably 45° angle, defined by the end lug portions of the handles to retain such in aligned disposition. If desired, the main portion of the magazine may simply comprise a lower plate on which the handles slide and which plate has parallel lateral edges engaging in the acute angle region to retain and guide the handles in aligned disposition.

The magazine will preferably be downwardly inclined from the discharge station of the sorting and aligning apparatus and a type of shuffle feeder will be provided so as to act on the upper surfaces of the main elongate portions of a plurality of the handles in the magazine and oscillate so as to engage said elongate portions in an upper position of the feeder and move downwardly, possibly with slipping action on said central portions, for a distance nearly twice the width of the elongate portions whereupon by means of a suitable linkage and limit control arrangement the sliding engaging skis or sliding pressure members are lifted away from the handles and the feeder returns upwardly and then re-engages with the central portions of the handles so that the pressure members are in locked position and the device then moves downwardly, as before, and the operation continues so that handles are constantly fed to the injection apparatus. Preferably the pressure members are lined on the lower surface in engagement with the handles with a hard rubber surface which will slide if excess resistance pressure is encountered.

At the lowermost end of the magazine each handle abuts against a fixed stop at the ends of the top guides and has its hand engaging surface lowermost and most adjacent the box in which the handle is to be inserted. The engaging end lug portions of the handle are simultaneously displaced downwardly by two pivotally displaceable pusher arms or formers to clear the fixed stop and to bring it into the path of engagement with a transfer pusher which moves the handle into the injection position and holds it there during injection. An injector plate moves downwardly from above and acts on the handle held by said pusher and pushes said handle downwardly into the apertures of a box aligned immediately therebelow and supported on a conveyor.

Box control means will be provided as a lower part of the injection apparatus and will operate in conjunction with the conveyor for conveying filled boxes from a supply. The box control apparatus will comprise a stop member displaceable by suitable means, e.g. pneumatic cylinder, into and out of the path of the boxes conveyed on the conveyor so as to stop a box and any boxes therebehind. The said first stopped box is thus directly aligned under the injection apparatus whereupon a box clamping means is applied to one side of the box and comprises a pneumatic cylinder which urges a clamping pad against said one side of the box so as to clamp the box against a rolling surface or surfaces on the opposite side of the box and which may be provided as a plurality of vertically spaced rollers.

Upon insertion of a handle in the apertures at the side of the box by the insertion apparatus, the cylinder and clamping plate operated thereby are displaced downstream with the completed box in the direction of the conveyor whilst still retaining the clamping action thereon with said displacement being effected by a suitable pneumatic cylinder. This displacement is sufficiently fast to provide rapid clearance of the thus completed box which is subsequently released by the clamping means which then returns to its first position for subsequent engagement with a box which has been moved by the conveyor more slowly and stopped by the stop means which moves into its path upon said rapid displacement of said first mentioned box by the clamping means.

It is to be appreciated that the various indexing movements, rotation, drive, displacement slides, clamping and rapid displacement arrangements may be controlled and effected by, for example, suitable hydraulic means although pneumatic means have been described in preference. Furthermore, suitable limit switches, sensors and control and synchronisation means are used in a manner as will be apparent to persons skilled in the art and such further disclosure is not considered necessary for understanding of the invention.

The invention will be described further, by way of example, with reference to the accompanying drawings in which.

Figure 1:
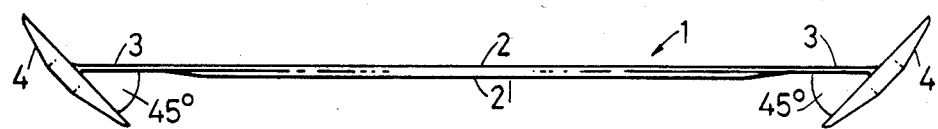
FIG. 1 is a side elevation of a plastics material handle.
Figure 2:
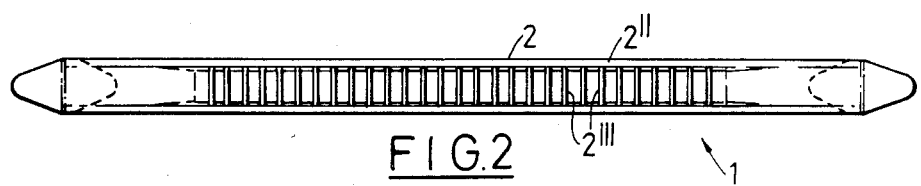
FIG. 2 is a plan view from above of the handle of FIG. 1.

In FIGS. 1 and 2 a plastics material handle as devised and designed by B. Wigemark of Goeteborg, Sweden and sold in the U.K. under the name "Formus" and is suitable for insertion of spaced apart apertures of a cardboard box for containing a flexible plastics bag for containing liquid such as wine. The handle 1 is shown in FIG. 1 in what might be termed its desired or "correct", aligned position which is desirable to permit subsequent insertion by an insertion apparatus into a box. The handle 1 comprises an injection moulded integral plastics material member having an elongate main body or handle portion 2 having a smooth curved lower surface 2' over a major portion of its length which surface is intended to be engaged by the hand of a carrier. The upper portion of the main body portion 2 comprises lateral ribs 2" with a plurality of transverse ribs 2''' extending therebetween. A reduced thickness portion 3 at each end of the main elongate body portion joins with end, engaging lugs 4 which have generally reduced width at their end portions and are shaped in known manner. The main body of each of the lug portions 4 extends along a plane which subtends an acute angle, preferably of approximately 45°, with the reduced thickness portion 3 at each end of the main body portion 2. The handle is of flexible plastics material and may be readily bent to permit insertion in the apertures of a box so that the lugs 4 subsequently reassume their position so as to prevent removal of the handle.

Handles 1 are supplied in random disposition and require to be separated and aligned prior to insertion in the apertures of a box and hitherto such operation of separation alignment and insertion has been effected manually.

Figure 3:
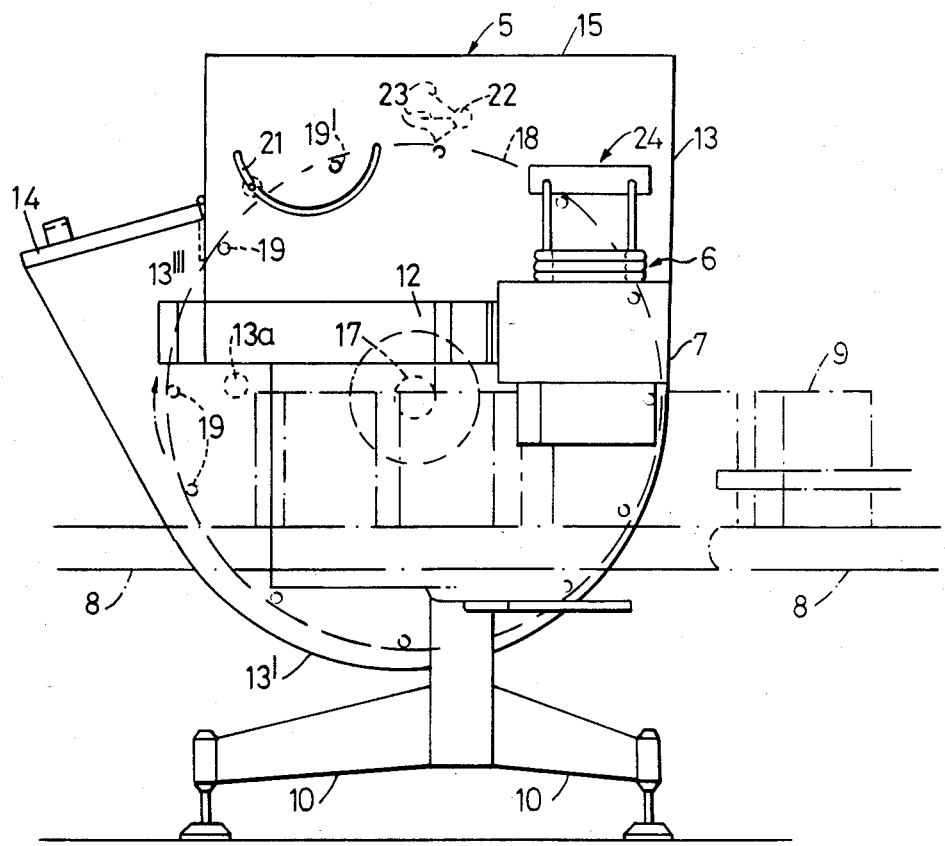
FIG. 3 is a schematic side elevation of a sorting and aligning apparatus viewed in the direction of arrow A of FIG. 4 and also illustrating a magazine for handles and an insertion apparatus and also indicating, in broken line, the disposition of a plurality of cardboard boxes on conveyors also shown in broken line.
Figure 4:
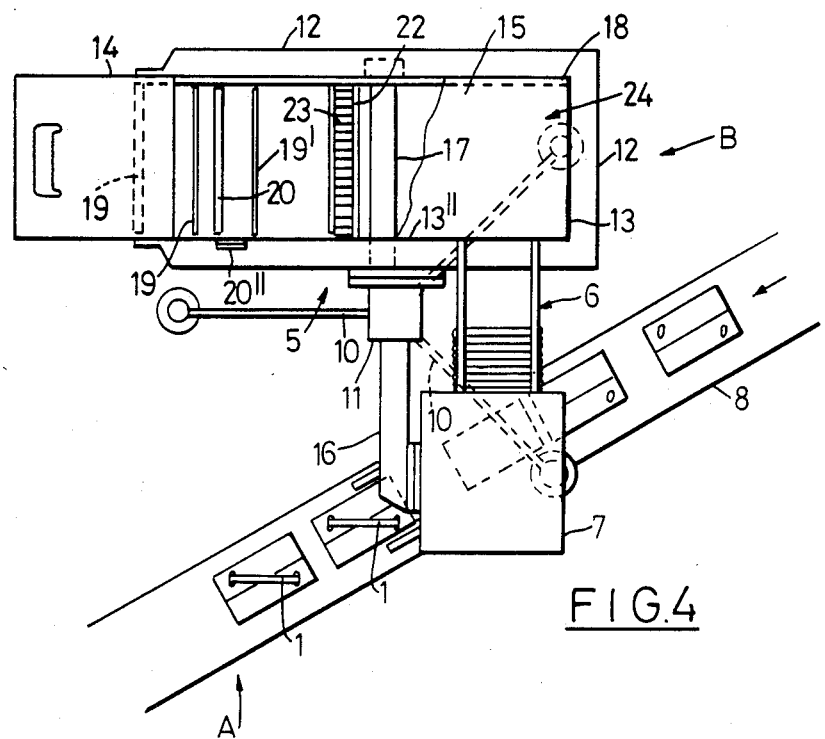
FIG. 4 is a plan view of the apparatus of FIG. 3.
Figure 5:
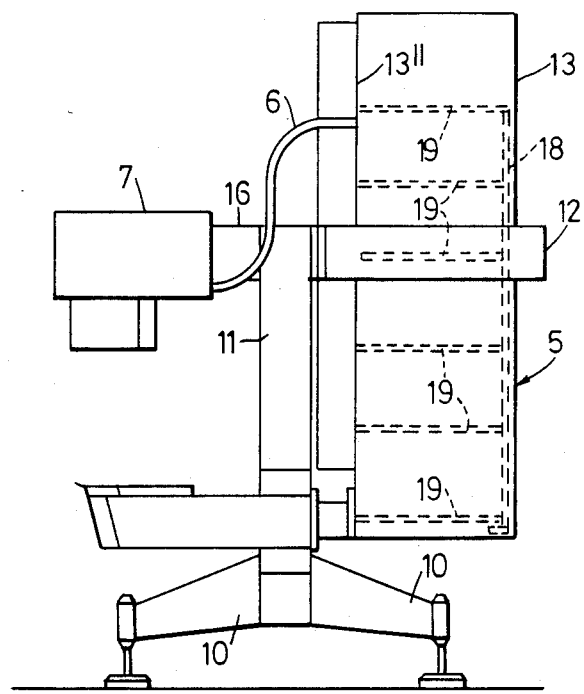
FIG. 5 is an end elevation of the apparatus of FIG. 4 viewed in the direction of arrow B but omitting details of the conveyor and boxes thereon.

FIGS. 3 to 5 illustrate a sorting and aligning apparatus 5 connected to a magazine 6 which leads to an insertion apparatus 7 mounted above a conveyor 8 on which boxes 9 are conveyed for insertion of handles and subsequent conveyance to desired locations.

The whole apparatus is supported on three legs 10 whose level is adjustable in known manner. A main support upright 11 extends from the legs 10 and has a box-section frame 12 of generally rectangular plan view at three sides of a hopper or reservoir housing 13 provided with an inlet flap 14 and top plate 15, part of which is shown broken away in FIG. 4. A section 16 of the box frame carried by upright 11 supports the insertion apparatus 7 and lower end of magazine 6.

A rotatably mounted and drivable axle or shaft 17 is rotatably mounted in means (not shown in detail) and extends across the housing 13 of the sorting and aligning apparatus 5. The shaft 17 has a circular plate disc 18 mounted at one side thereof and so as to rotate therewith and drive means (not shown) are provided, such as a toothed gear wheel and reciprocable pinion mounted so as to drive in one direction only and driven by pneumatic air cylinder means or the like so as to provide a stepwise drive or indexing of the disc 18 so that such moves stepwise, in clockwise direction as viewed in FIG. 3 and as indicated by the broken arrow therein. It is believed that the means for producing the intermittent drive or indexing for the disc 18 will be readily apparent to persons skilled in the art and need not be described further in detail.

The lower portion of housing 13 as shown in FIGS. 3 and 5 has an outer wall defining a convolute portion or cylindrical wall portion 13' which leads to an inlet portion covered by pivotable cover flap 14. The axle 17 and thus disc 18 is mounted eccentrically with respect to the centre of the cylindrical portion 13' so that the edge of the disc in the left-hand portion of FIG. 3, i.e. in the direction of movement thereof, moves away from the lower and cylindrical wall of the housing 13 so as to avoid trapping of handles 1 (not shown in FIGS. 3 to 5) which are located in mixed arrangement in a lower portion of the housing 13. This arrangement avoids the trapping of any handles by transverse carrier rods 19 which will be described hereinafter.

A plurality of transversely extending carrier rods 19 (twelve in all in the embodiment illustrated) are provided equidistantly spaced about the disc 18 and located at the periphery thereof and extend across the body of the housing 13 in cantilever fashion and have their free ends extending towards and terminating close to the end wall 13" of the inside of housing 13. These carrier rods 19 are of such diameter as to be able to engage beneath the lug portions of the handles 1 in the 45° subtended angle region thereof upon pssing through a mass of such handles and cause such to be lifted upwardly with the sequential stepping movement such as illustrated in schematic illustration of FIG. 6.

Figure 6:
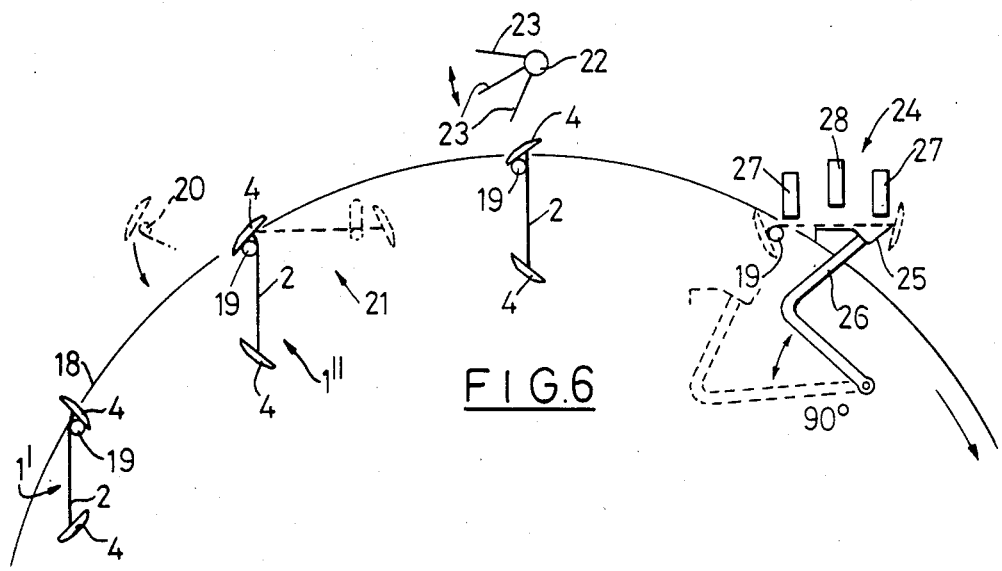
FIG. 6 is a schematic side illustration representing various stages in the movement path of the support means and carrier means for the handles and illustrating different stations of operation thereon namely a sorting station, dislodging or "combing" station for removing doubly disposed handles, and an aligning and discharge station.

In FIG. 6 the left hand handle 1' is what might be termed in the "incorrect" position with the elongate portion extending on the left hand side of the carrier rod 19 whilst the next upwardly illustrated handle 1" is in what is termed the correct position as regards operation of the present machine. As the disc 18 rotates, handles 1 will be collected by the rods 19 in dispositions such as handles 1' or 1" or mixtures of such dispositions and it is necessary to achieve a suspension of the handles on one side only of the carrier rods 19 as illustratd by the handle 1". This "sorting" operation is effected by means of a selective, handledislodging device which comprises an elongate rod 20 of circular cross section of greater diameter than the circular cross section of the carrier rods 19 so as not to collect handles thereon and said selective dislodging rod 20 is mounted on a pivotally mounted lever 20' operable by means of a pneumatic air cylinder (not shown) located outwardly on the container wall 13'. The dislodging rod 20 has a reduced diameter portion extending through an arcuate slot 21 in the wall of the housing 13" and connected with said lever means. The rod 20 is pivotally displaceable along the arc of slot 21 from a position outwardly of the path of the periphery of the disc 18, under the rod 19' in the sorting station and then upwardly to a position substantially horizontally level with the position of carrier rod 19' illustrated in FIG. 3 so that any handles 1' or 1" are caused to tilt to a substantially horizontal disposition so that any "incorrectly" collected handles 1' fall off under the action of gravity etc. whilst "correctly" collected handles 1" do not fall off by virtue of their suspension and the position of engagement by the rod 20. The rod 20 engages handles 1" and also 1' to the right hand side of their centres of gravity as viewed in FIG. 6 so that incorrectly collected handles 1' fall away whilst correctly selected handles 1" remain in position. The region of action of rod 20 on the handles should not be too close to the end of correctly collected handles 1" to cause dislodgement thereof—possibly by engagement with the free end lug portion 4.

Thus it will be appreciated that as the carrier rods 19 move stepwise in indexing fashion into the sorting region and the region of the operation of the selective dislodging rod 20, the handles which are incorrectly suspended are sorted from correctly suspended handles. Subsequent to the sorting station at 19', the next indexing movement of the disc 18 moves those handles suspended correctly on one side of the rods 19 and 19' to a "combing" dislodging station which ensures any doubly mounted handles, i.e. mounted one on the other, do not pass therethrough and such station may include air jets which act on any handles mounted one on the other to dislodge the uppermost. However, in the embodiment illustrated there is provided a reciprocating comb in the form of a reciprocating cross bar 22 having a plurality of tines or prongs 23 arranged therealong and preferably in three offset rows such that the spacing between any adjacent prongs 23 of any of the rows is not greater than the width of a lug 4 of a handle means. The drive for the cross bar 22 is not shown although operates at the same time as the selective dislodging device, i.e. at the same time as the pivoting of the rod 20, and when carrier rods 19, 19' are stationary.

After passing through the "combing" station when doubly-mounted handles are removed, the next indexing step of the disk 18 takes the correctly disposed, singly carried handles 1" to an aligning and discharge station 24—a portion of which is illustrated schematically in FIG. 6. A shaped aligning plate 25 is mounted on an angled pivot arm 26 and the plate 25 extends across the width of the housing 13 so as to engage all handles 1" supported by carrier rods 19. The pivot arm 26 is reciprocally driven by means (not shown) which are considered readily apparent to persons skilled in the art and this lever 26 is reciprocal between the position shown in FIG. 6 and the broken line representation thereof in FIG. 6 The movement into the position of FIG. 6 takes place at the same time of operation of the selective dislodging or sorting station and the "combing" station, i.e. when the carrier rods 19 are stationary. In operation the aligning plate 25 moves from the position shown in broken line in FIG. 6, through the path of displacement of the suspended handles 1" and engages the lower lug portion 4 in the 45° subtended angle and carries such upwardly into a horizontal disposition whereupon the lever 26 is locked in position by means not shown.

Two transverse guide and retaining rods 27 extend across the width of the interior of the housing 13 and are supported by means (not shown) located outwardly of the path of the rods 19. The transverse guide rods 27 are spaced above the horizontal upper surfaces of plate 25 for supporting the handles 1" at a distance slightly exceeding the thickness (height as viewed) of the central elongate portion 2 of the handle 1 so as to carefully retain such in position. A third, middle transverse retaining rod 28 is provided with its lower surface located slightly above the level at which the lower surfaces of the bars 27 are located and such bar 28 is spaced above the plane of the uppermost surfaces of plate 25 at approximately twice the thickness of the central elongate portion 2 of the handles 1 and is provided to avoid any handles 1 which may be laid across each other.

Figure 7:
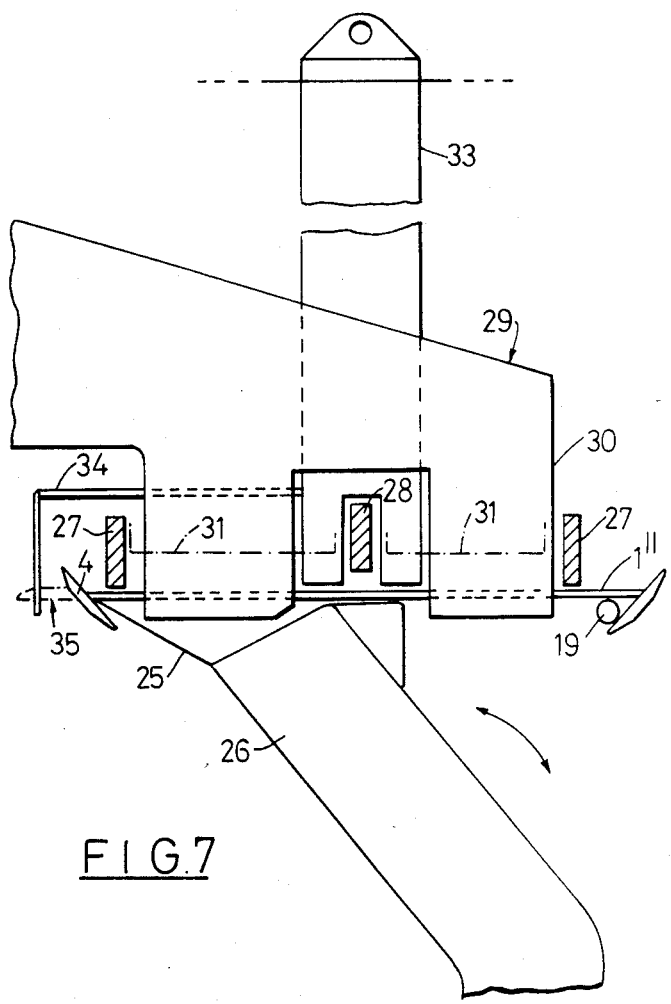
FIG. 7 is a schematic side elevation of the aligning and discharge station viewed from the opposite side of that of FIG. 6 and showing a handle in a horizontally disposed position prior to displacement and discharge into a magazine.
Figure 8:
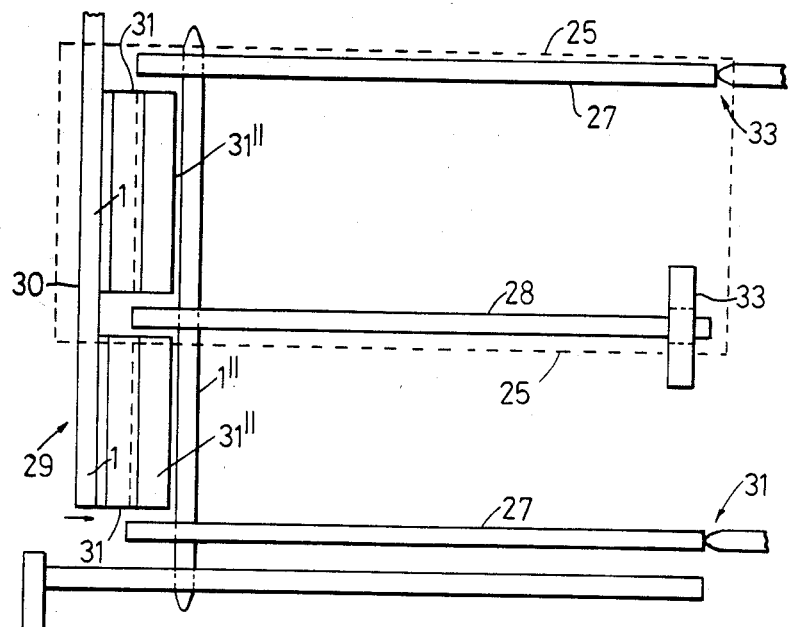
FIG. 8 is a schematic plan view of the apparatus of FIG. 7 but showing the pusher apparatus for the handles acting upon a handle in its horizontally aligned position.

In the enlarged fragmentary schematic illustration of FIG. 7 taken from the opposite side to the viewpoint of FIG. 6 the end of the reciprocable lever 26 is illustrated carrying the shaped aligning plate 25 at the end thereof which plate 25 extends across the width of the interior of the housing 13. A pusher device 29 is provided mounted within the housing 13 on displaceable support means (not shown) and is horizontally displaceable across the width of the housing upon positioning of the aligning plate 25 in the position shown in FIG. 7. The pusher device comprises a displaceably mounted carrier arm 30 mounted on grooved roller bearings displaceable along a track (not shown) and has two spaced apart handle engaging members 31 of identical construction mounted thereon each having a lowermost handle engaging portion 31' and a horizontal extending handle restraining portion 31" which is intended to locate above the central, horizontally disposed elongate portion 2 of the handle 1 to prevent upward movement of the handle. The handle engaging members 31 are shaped and disposed so as to be displaceable along the spaces between each of the bars 27 and the central bar 28 and each act upon horizontally disposed handles 1" to slidably displace such along the aligning plate 25 and beneath the bars 27 and the central bar 28 to a discharge end thereof 31 for subsequent guidance and entrainment storage in a magazine 32.

Figure 9:
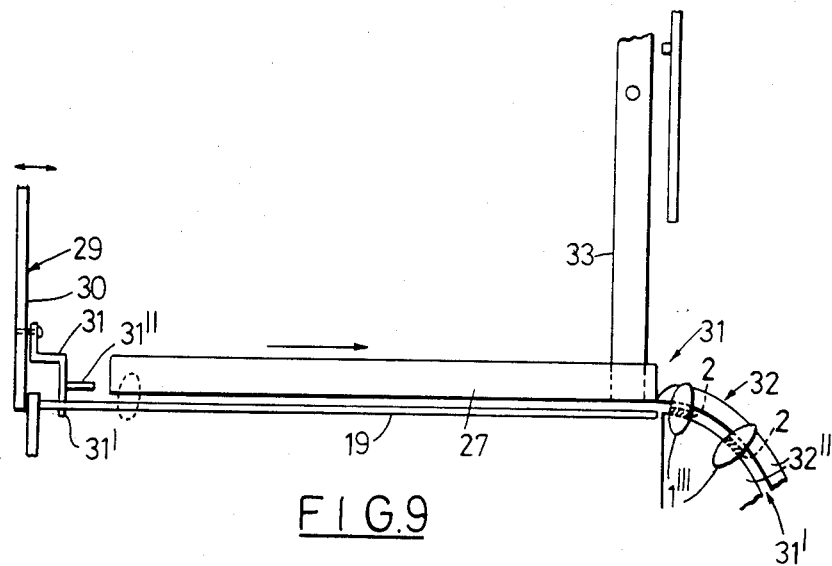
FIG. 9 is a schematic side elevation of the apparatus of FIG. 7 and 8 showing in a left hand portion the pushing apparatus in its non-operational position and moved away from the horizontally disposed handles.

A pivotally mounted and suspended reversing lever 33 is provided having a bifurcated end or slot at its lowermost end so as to have clearance from central rod 28. The reversing lever 33 may swing in desired manner and may be biased into a stationary position. A suitable pressure switch 23' and control circuit is associated with the reversing lever 33 such that when the pusher device 29 moves to the limit of its operative traverse, i.e. in the righthand portion of FIG. 9, the ends of the retaining portion 31" abut against the reversing lever 33 causing such to pivot and operate the control circuit for the pusher device 29, thus causing the pneumatic drive thereof (not shown) to be reversed so as to cause the pusher device 29 to move to the lefthand position as shown in FIG. 9.

With normal operation of the pusher device 29, upon movement towards the discharge station 31 the handles are slidably displaced under the cross bars 27 to the magazine 32 and at the ends of its movement the pusher device 29 the portion 31" acts on the reversing lever 33 to cause reversal of the device 29. The lowermost end of the reversing lever 33 is located above the supporting surface of the aligning plate 25 (platform) at a limited distance which allows single handles to pass thereunder although should there be any double thickness central portions, i.e. crossed handles or handles lying one on the other, such handles act upon the reversing lever to cause the pusher device to be reversed so that the next subsequent indexing operation will cause all the handles on the plate 25 to be returned to the reservoir by movement of the lever 26 downwardly to the left and to a lower position than shown to cause the handles to fall thereof.

As shown in FIG. 7, an extension 34 is mounted on the reversing lever 33 and has a portion extending into a region 35 which would be engaged by any accidentally incorrectly disposed handle 1' which might, in an unlikely eventuality, possibly reach this stage, in which case the lugs 4 would be squeezed to extend substantially horizontally and to extend beyond the normal position of the correctly positioned lugs 4 whereupon the reversing lever 3 is actuated and the handles would then be returned to the reservoir of the hopper by the downward movement of plate 25.

It should be appreciated that the control circuitry, reversing devices and synchronism of the machine so as to cause the selective-dislodgement, combing, displacing and reversing operations to occur substantially at the same time will be provided in known manner to operate in synchronism with the indexing of the main disc and it is considered such will be readily provided by persons skilled in the art and thus need not be described or illustrated.

Turning now to the magazine 6 this comprises a lowermost sliding support platform with two spaced apart side rails at either edge portion thereof which rails engage the lugs 4 of correctly aligned handles emanating from the discharge station 31. A shuffle-type slider mechanism is provided having two parallel ski-like surfaces coated with hard rubber to provide a sliding action upon meeting resistance, and the operation is such that this device reciprocates at an angle to provide regular feed to a stop at the lowermost portion of the magazine.

The magazine feeder (shown in FIG. 10) operates each time a handle is injected so as to make-up the gap at the bottom of the magazine. If the hopper discharge or feeder device is trying to push handles down the chute provided by the magazine, the feeder will not have much effect if the magazine is full and it may just clamp and skid over handles but the mechanism is required to make up gaps in the injection apparatus when the hopper is not at the discharge part of its cycle.

Figure 10:
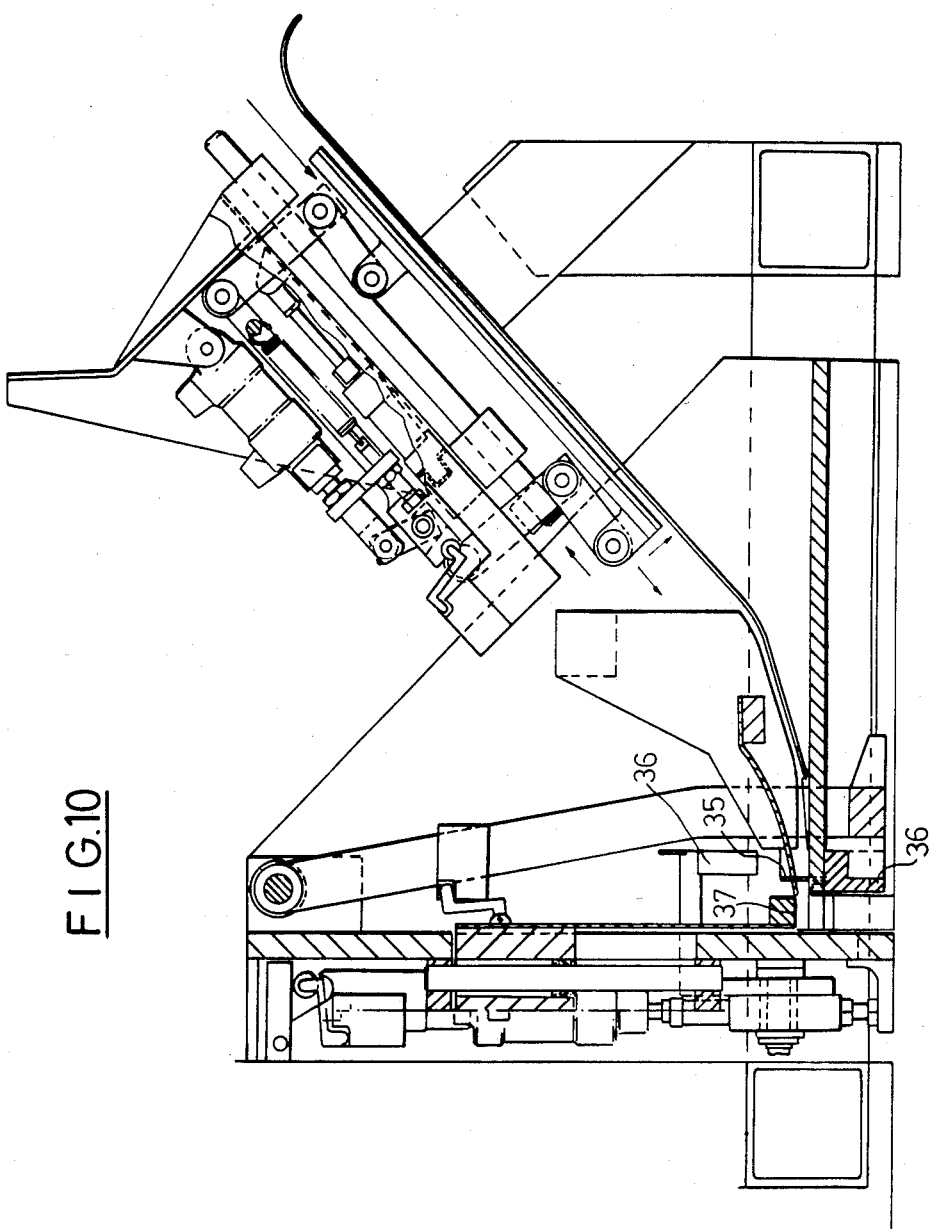
FIGS. 10 and 11 are respectively elevations of a reciprocating feed clamping means of a shuffle type feeder and of an injection apparatus for bending over the end lug portions of the handle when abutting against fixed stops of the magazine for subsequent insertion into a box located therebelow.
Figure 11:
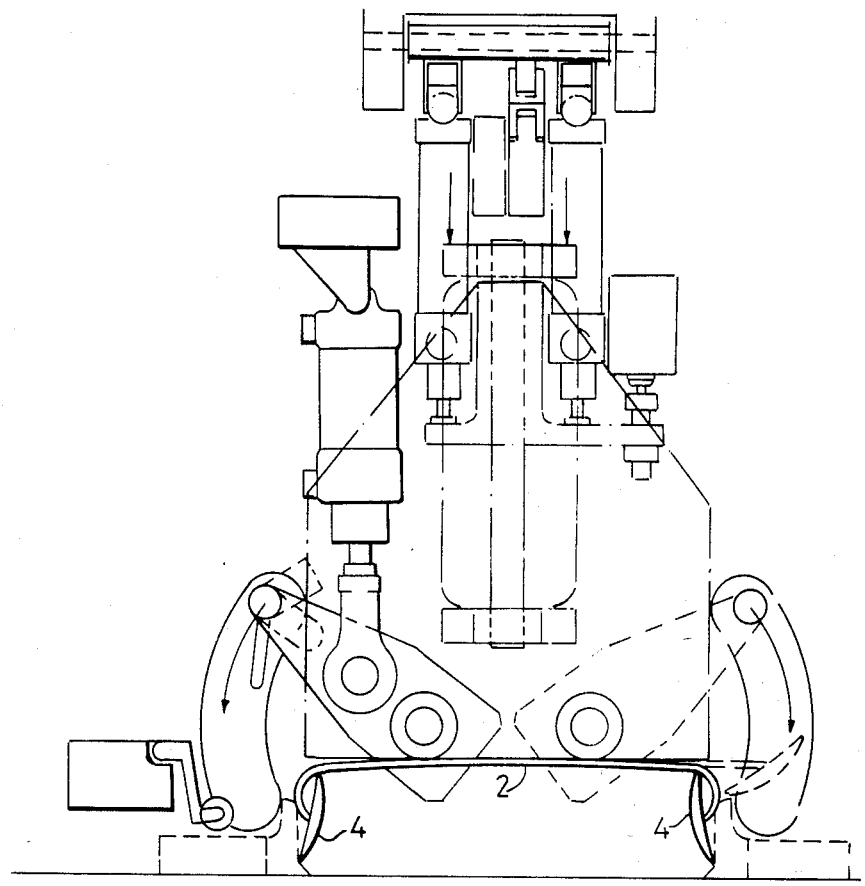
Figure 12:
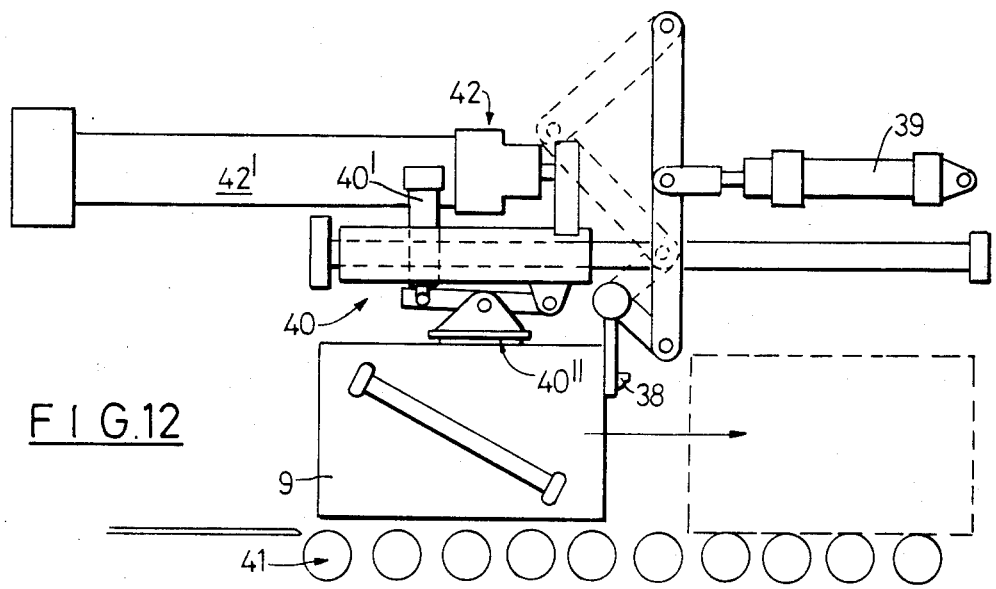
FIG. 12 is a schematic plan representation of a stop means for a box and a clamp and rapid displacement arrangement for removal of the box with inserted handle prior to the next insertion operation.
Figure 15:
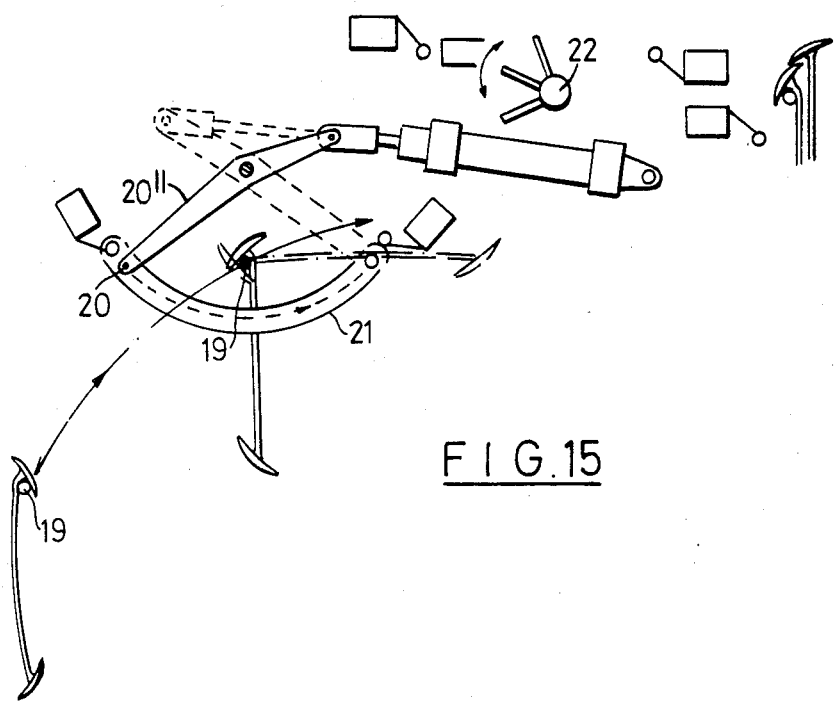
FIG. 15 is a schematic elevation showing various displacement arrangements similar to the view of FIG. 6.
Figure 13:
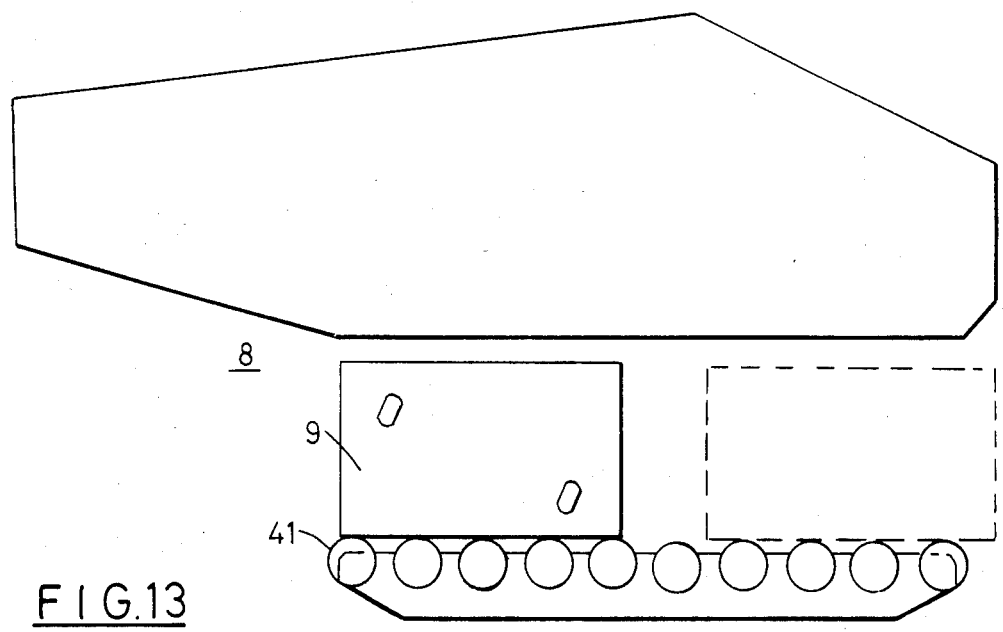
FIG. 13 is a plan view illustrating the box path on the conveyors relative to the machine frame.

As regards the injection apparatus shown especially in the left-hand portion of FIG. 10 and in FIG. 11, when a handle arrives at the bottom of the chute of the magazine it is stopped by a stop. A former bends the handle ends or lugs down to clear the fixed stop but to bring it into the path of a transfer pusher which moves the handles to the injection position and holds there during injection into a box therebelow.

The insertion apparatus comprises a double acting pneumatic injection cylinder which displaces an injector plate when the transfer pusher at the bottom of the magazine locates a handle beneath the plate and when a box is stopped in position therebeneath.

The stop and rapid conveyor device for the boxes beneath the insertion apparatus comprises a stop member displaceable by a box clamp pneumatic cylinder into and out of engagement with boxes on a conveyor on which cardboard boxes, having apertures therein, move. The stop is controlled by suitable sensors so that it moves into and out of engagement thus stopping a box in accurate and desired position beneath the insertion apparatus whereupon the synchronism of the machine is such that a handle with downwardly folded lugs displaced downwardly by the insertion apparatus so the lugs are inserted into the apertures of the box whereupon the injector plate is removed and the lugs engage within the aperture. The fast forward accelerating means including a pneumatic box ejection cylinder operates to displace the clamp holding the box out of the insertion region faster than the conveyor operates to move the next box into the insertion region whereupon the stop returns to the stop operative position and stops the next box beneath the insertion apparatus. The clamp releases its box and returns to engage the thus stopped box and the insertion operation continues.

In FIG. 3 it should be noted that a wall portion or baffle 13''' may be provided close to the path of carrier rods 19 to prevent an excess or interlocked mass of handles from being picked-up as may a cross bar 13a on the other side of the movement path extending across the hopper 13.

Figure 14A:
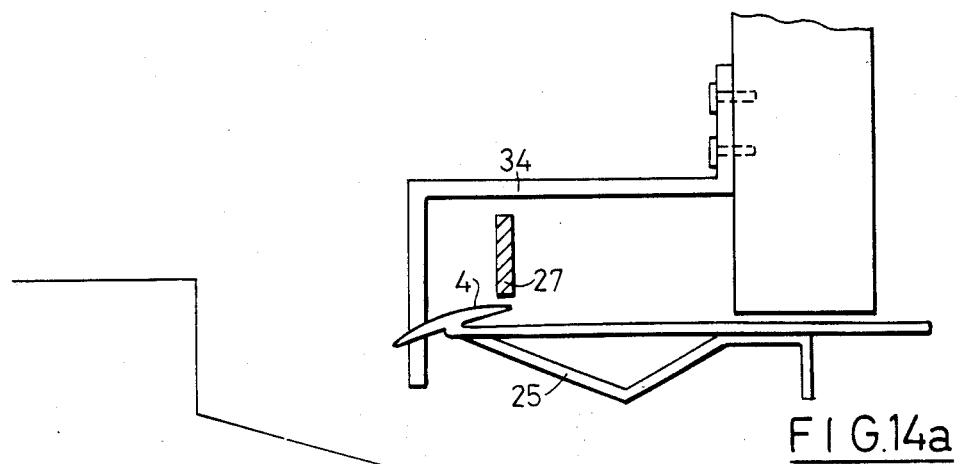
FIG. 14A is a schematic, enlarged fragmentary detail of a reversing lever with extension arm for engaging any accidentally incorrectly disposed handles which are in an inverted and/or crossed disposition.
Figure 14:
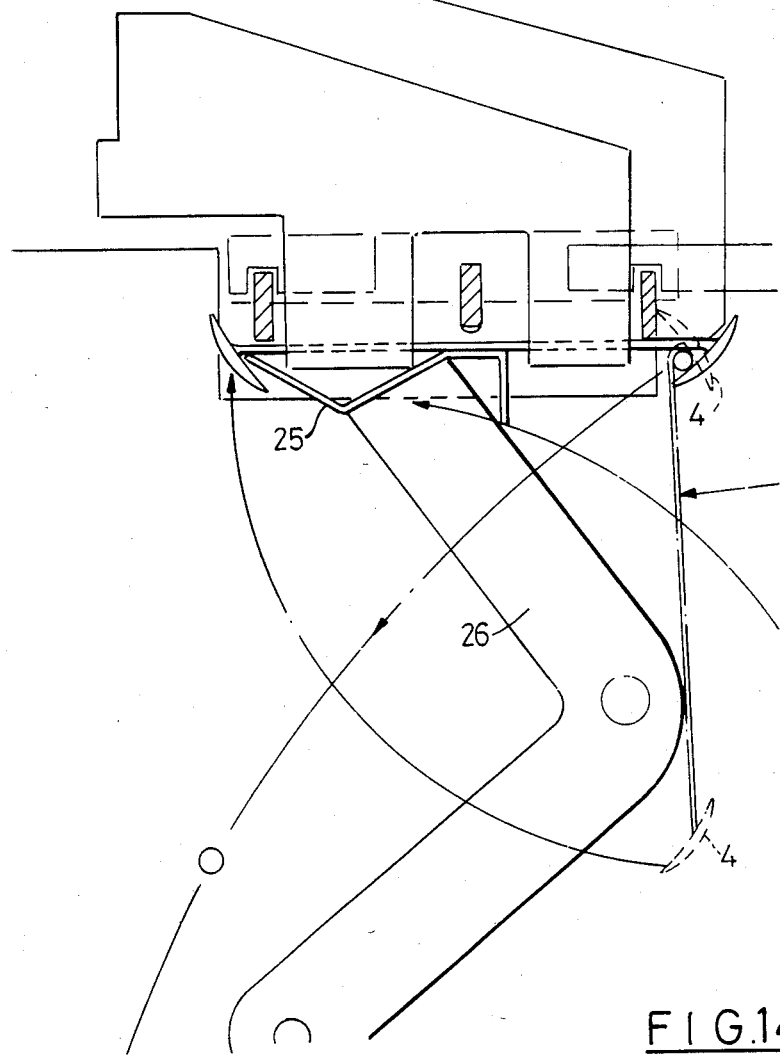
FIG. 14 is a somewhat more detailed view with notes similar to FIG. 7.

The platform or plate 25 and arm 26 from the full line position shown in FIGS. 3 and 14 pivot in their reciprocating operation through 90° to clear the path of the handles and allow any incorrectly positioned or crossed handles to fall away or be carried past the discharge station and back into the reservoir of handles.

To avoid handles becoming caught between the disc 18 and the adjacent side wall of housing 13 a labyrinth seal (not shown) may be provided or, alternately, a nylon or other material flat band (not shown) may be provided engaging against the outermost circular surface of disc 18 and abutting the adjacent housing wall so as to act as a seal to the space between the disc 18 and wall. One end of the band will be secured and the other end resiliently (spring) mounted to allow the band to "give" and avoid such providing a braking effect or causing excessive wear.

I claim:

1. An apparatus for sorting platic material handles for cardboard boxes or the like containers, with said handles comprising a main, elongate portion with a lug at each end extending on either side of the plane of said elongate portion and subtending an acute angle at one side of the handle, comprises a housing defining a reservoir portion for receiving a supply of randomly disposed handles; rotary support means and drive means therefor, supporting at least one carrier rod displaceable through said reservoir portion and which carrier rod and each of them is of a diameter such as to be able to engage between the main elongate portion of the handle and the portion of the lug subtending an acute angle therewith; means for ensuring handles picked up by each said carrier rod are transported by each said carrier rod only on one selected side thereof for further processing; and means for removing the thus sorted handles in alignment and supplying such for subsequent handling and processing; wherein said means for sorting the handles carried by each of the carrier rods ensure the handles are supported on one selected side of each of the carrier rods comprises a selective, handle-dislodging means displaceable beneath each carrier rod when it is in an upper region of its movement path and engageable with one or more handles which may be suspended therefrom to displace the main bodies of the handles upwardly and to one side of each of said carrier rods and cause any handle disposed on one "incorrect" side of each said carrier rod to be disengaged from said carrier rod while permitting any handle disposed on the opposite, "correct" side of said carrier rod to remain suspended therefrom.

2. An apparatus as claimed in claim 1 characterized by the feature that said rotary support means includes a plurality of said rods which are substantially horizontally disposed elongate rods extending from a rotary disc acting as the rotary support means and with said rods being rotatable so as to pass through the region of the housing which is to contain a randomly disposed supply of handles and displaceable therethrough so as to move upwardly through the reservoir of handles to an upper position wherein said selectie, handle dislodging means acts on any handles carried thereby.

3. An apparatus as claimed in claim 2, characterized by the feature that the housing for the rotary disc has a lower portion with a cylindrical defining edge wall extending between two substantially vertical side walls and the axis of rotation of said disc is eccentrically disposed relative to the centre of the circle from which the cylindrical portion is generated so that in the region where carrier rods may engage handles the path thereof moves gradually away from the cylindrical wall thereby avoiding any risk of trapping handles against the outer lower wall of the housing.

4. An apparatus as claimed in claim 1, characterized by the feature that the selective handle-dislodging means comprise an elongate substantially horizontally disposed handle engaging rod mounted on the end of a pivotally mounted lever arm activated by a pneumatic piston cylinder arrangement and so disposed on the housing of the apparatus as to be displaceable, preferably along an arcuate path and preferably from a position outside of the path of rotation of the rods, through said path and beneath each of the rods when it arrives in an upper position, and then the engaging rod moves upwardly to substantially the same horizontal level as the carrier rod in the upper position on which any handles are suspended so as to engage and tilt any handles carried by said carrier rod and disengage incorrectly disposed handles from one side of said carrier rod for such to be returned to the main storage part of reservoir.

5. An apparatus as claimed in claim 1 wherein the position of engagement of the engaging rod with respect to the handles supported on a carrier rod especially in the uppermost position of displacement thereof, is arranged such that the centre of gravity of the handles supported thereon be between the uppermost operative position of said disengaging rod and the carrier rod in said upper position so that the weight of a correctly supported handle retains the handle in position on the carrier rod whilst an incorrectly suspended handle will disengage its lug from the carrier rod and return to the reservoir.

6. An apparatus as claimed in claim 1 in which the drive means is such that in operation the carrier rods are rotated so as to undergo an indexing movement or and each carrier rod is stationary when in the upper position when the selective disengaging means operates.

7. An apparatus as claimed in claim 1, characterized by the feature that in a dislodging station subsequent to the selective disengaging station, the handles supported on the "correct" side of said carrier rod are engaged by dislodging means which are adapted to operate so as to dislodge any handles which are located on one side of said carrier rod but which are located one on top of the other.

8. An apparatus as claimed in claim 1 characterized by the feature that a magazine positioned in the entrance region comprises two laterally spaced apart slots each defined by a pair of vertically spaced guide members and positioned to receive the elongate portions of the handles adjacent the lugs from the discharge station of said aligning and discharge apparatus and to engage within the acute angle defined by the end lug portions of the handles to retain such in aligned disposition and by the feature that at least the main portion of the magazine comprises a lower plate member on which the handles slide and which plate members have parallel lateral edges engaging in the acute angle region to retain and guide the handles in aligned disposition.

* * * * *